(12) United States Patent  (10) Patent No.: US 7,380,034 B2
Fujiwara et al.  (45) Date of Patent: May 27, 2008

(54) METHOD OF ARBITRATION FOR BUS USE REQUEST AND SYSTEM THEREFOR

(75) Inventors: Takafumi Fujiwara, Tokyo (JP); Katsunori Kato, Kanagawa (JP); Noboru Yokoyama, Tokyo (JP); Atsushi Date, Tokyo (JP); Tadaaki Maeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/110,667

(22) Filed: Apr. 21, 2005

(65) Prior Publication Data

US 2005/0188139 A1   Aug. 25, 2005

Related U.S. Application Data

(62) Division of application No. 10/314,285, filed on Dec. 9, 2002, now Pat. No. 6,952,747.

(30) Foreign Application Priority Data

Dec. 18, 2001 (JP) ............................. 2001-384698

(51) Int. Cl.
  *G06F 13/00* (2006.01)
(52) U.S. Cl. ...................................... 710/116; 710/117
(58) Field of Classification Search ................ 710/116, 710/117
  See application file for complete search history.

(56) References Cited

U.S. PATENT DOCUMENTS

| 3,820,081 | A | | 6/1974 | Donahue ................... 711/151 |
| 3,821,709 | A | | 6/1974 | Curley et al. .............. 711/151 |
| 4,759,965 | A | | 7/1988 | Kato et al. ................. 428/138 |
| 4,972,313 | A | | 11/1990 | Getson, Jr. et al. ......... 364/200 |
| 5,297,292 | A | * | 3/1994 | Morimoto et al. .......... 710/113 |
| 5,572,686 | A | * | 11/1996 | Nunziata et al. ............ 710/116 |
| 5,808,376 | A | | 9/1998 | Gordon et al. ................ 307/66 |
| 5,862,353 | A | * | 1/1999 | Revilla et al. .............. 710/107 |
| 6,189,076 | B1 | | 2/2001 | Fadavi-Ardekani et al. 711/147 |
| 6,275,890 | B1 | | 8/2001 | Lee et al. ................... 710/131 |
| 6,347,202 | B1 | | 2/2002 | Shishizuka et al. ........... 399/75 |

(Continued)

FOREIGN PATENT DOCUMENTS

JP   02-003851 A   1/1990

(Continued)

*Primary Examiner*—Glenn A. Auve
(74) *Attorney, Agent, or Firm*—Fitzpatrick, Cella, Harper & Scinto

(57) ABSTRACT

In plural master apparatus connected to a bus, a master apparatus issues, to an arbiter, a request signal requesting the use of the bus after a lapse of a predetermined interval when the use of the bus becomes necessary, while another master apparatus issues, to the arbiter, a request signal requesting the use of the bus immediately when the use of the bus becomes necessary. The arbiter grants a right to use the bus by equally handling the request signals from the master apparatus. Also there is prepared a signal indicating a traffic in the bus, and the request signal is issued after the lapse of the interval in case of a high traffic but it is issued immediately in case of a low traffic. It is thus possible to adjust the practical priority of the but use right in detail or to dynamically change such priority by the presence or absence of such interval or a length thereof.

8 Claims, 4 Drawing Sheets

U.S. PATENT DOCUMENTS

| | | | |
|---|---|---|---|
| 6,745,273 B1 * | 6/2004 | Gehman et al. | 710/113 |
| 6,880,028 B2 * | 4/2005 | Kurth | 710/240 |
| 6,952,747 B2 * | 10/2005 | Fujiwara et al. | 710/110 |
| 2002/0062414 A1 * | 5/2002 | Hofmann et al. | 710/110 |
| 2003/0030824 A1 | 2/2003 | Ogasahara et al. | 358/1.8 |
| 2003/0229743 A1 | 12/2003 | Brown | 710/113 |

FOREIGN PATENT DOCUMENTS

| | | |
|---|---|---|
| JP | 3-263159 A | 11/1991 |

* cited by examiner

METHOD OF ARBITRATION FOR BUS USE REQUEST AND SYSTEM THEREFOR

This application is a divisional of application Ser. No. 10/314,285, filed Dec. 9, 2002 now U.S. Pat. No. 6,952,747, the contents of which are incorporated by reference herein.

BACKGROUND OF THE INVENTION

1. Field of the Invention

The present invention relates to an arbitration method for a bus use requests in a system in which plural master apparatus are connected to a slave apparatus through a bus.

2. Related Background Art

In the known art, a master apparatus connected to a bus, in case of a need for using the bus, immediately issues a request signal requesting a bus use right. The arbitration of the priority for the bus use rights is executed by an arbiter.

However, it is difficult to achieve a fine adjustment in the arbitration of the priority of the bus use rights by the arbiter, and to dynamically change the priority. Also the logic required for such arbiter is very complicated.

SUMMARY OF THE INVENTION

In consideration of the foregoing, an object of the present invention is to provide a method capable of a fine adjustment of the priority of the bus use rights, and a system for such method.

Another object of the present invention is to provide a method capable of dynamically changing the priority of the bus use right and a system for such method.

According to one aspect, the present invention which achieves these objectives relates to a master apparatus constituting a system including plural master apparatus which are connected to a slave apparatus through a common path and an arbiter for arbitrating requests for the use of such path, the master apparatus including timer means for measuring a predetermined interval from a time when the use of the path becomes necessary, and issuing means for issuing a request signal for requesting the use of the path to the arbiter after the lapse of the above-mentioned interval.

According to another aspect, the present invention which achieves these objectives relates to an arbitration method in a system including plural master apparatus which are connected to a slave apparatus through a common path and an arbiter for arbitrating requests for the use of such path, the method including a step of measuring a predetermined interval from a time when the use of the path becomes necessary in at least one of the plural master apparatus, a step of issuing a request signal for requesting the use of the path after the lapse of the predetermined interval and a step that the arbiter equally handles the request signals from the plural master apparatus to arbitrate the request for the use of the path.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

In the following, the present invention will be further clarified by preferred embodiments thereof, with reference to accompanying drawings.

First Embodiment

In the following there will be given an explanation on a first embodiment of the present invention, with reference to the accompanying drawings.

Figure 1:
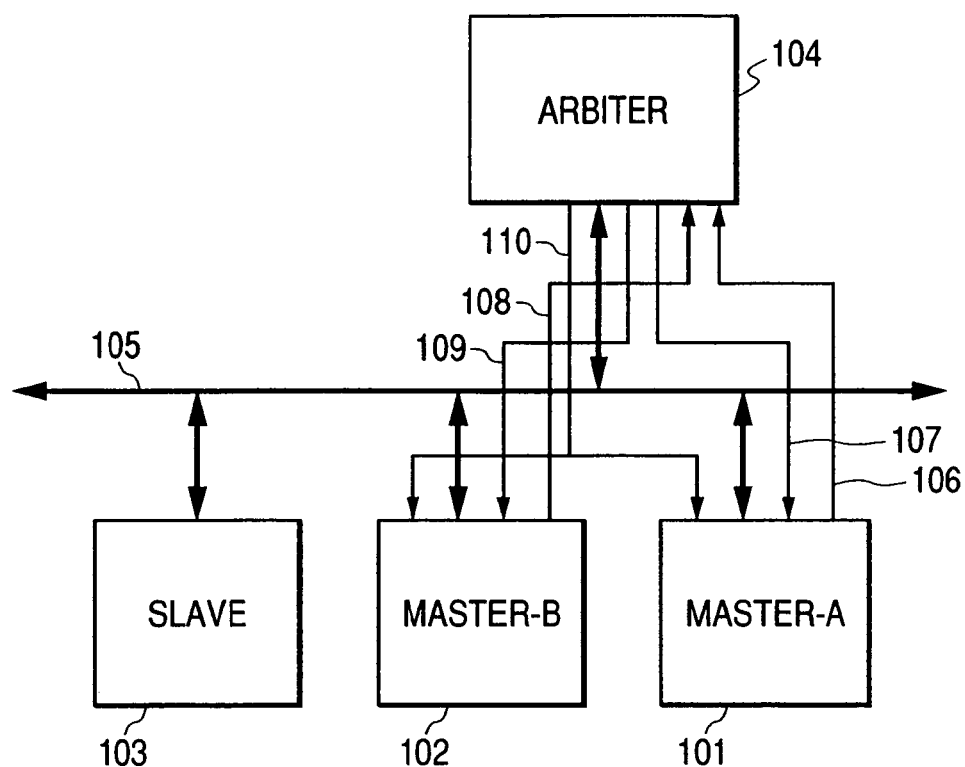
FIG. 1 is a block diagram of a system of a first embodiment.

FIG. 1 is a block diagram of a system in the first embodiment of the present invention. A master apparatus A101, a master apparatus B102 and a slave apparatus 103 are connected through a system bus 105, and an arbiter 104 executes arbitration of requests for a bus use right from the master apparatus A101 and the master apparatus B102.

The master apparatus A101 asserts a request signal A106 at requesting a bus use right, and the arbiter 104 asserts a grant signal A107 at giving a bus use right to the master apparatus A101. Similarly, the master apparatus B102 asserts a request signal B108 at requesting a bus use right, and the arbiter 104 asserts a grant signal B109 at giving a bus use right to the master apparatus B102. Also the arbiter 104 informs, by a no-request signal 110, that neither the request signal from the master apparatus A101 nor that from the master apparatus B102 is asserted.

The arbiter 104 deals with all the requests equally, in such a manner that the priority for the bus use right is same for all the master apparatus. Also the method of arbitration will be an ordinary round robin method.

Figure 2:
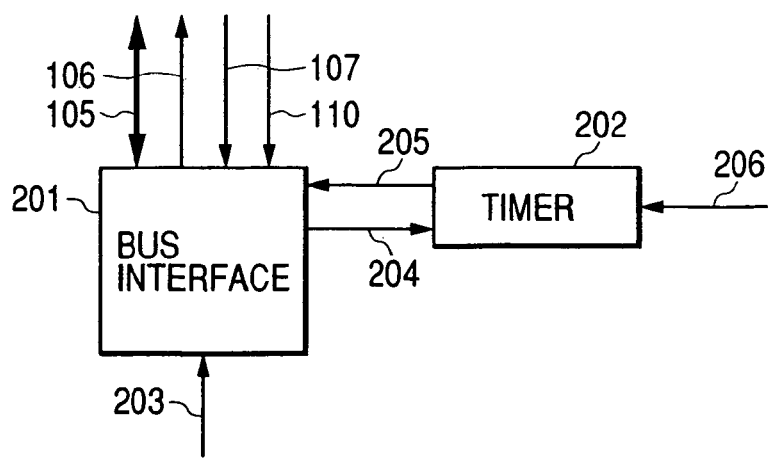
FIG. 2 is a diagram showing the details of a bus interface in a master apparatus of the first embodiment.

FIG. 2 is a block diagram around a bus interface of the master apparatus A101. An interval timer A202 is connected to a bus interface A201. A transaction start signal A203 transmits a command to start a transaction using a bus, from an internal logic of the master apparatus A101 to the bus interface A201.

The interval timer A202 counts an interval from a time when the transaction start signal A203 is asserted to a time when the request signal A106 is actually asserted. In the interval timer A202, an interval set value A206 is loaded according to a load signal A204. Such value can be changed for example by a register setting. An expiration signal A205 informs that the interval timer A202 has expired as a result of a count-down operation.

Let it be assumed that a transaction start signal A203 is asserted by the internal logic of the master apparatus A101. In case the no-request signal 110 is not asserted, a load signal A204 is transmitted to the interval timer A202 in order to insert an interval. The interval timer A202 executes loading of the interval set value A206 and initiates a count-down operation. When the interval timer A202 reaches 0, the expiration signal A205 is asserted. In response thereto, the bus interface A201 asserts the request signal A106 to the arbiter A104.

In case the no-request signal 110 is asserted, the interval is not inserted, so that the request signal A106 is asserted as soon as the transaction start signal A203 is asserted.

The arbiter 104 executes arbitration, and then asserts the grant signal A107 when the bus use right becomes ready to be given to the master apparatus A101. In response thereto, the bus interface A201 initiates a transaction on the system bus 105.

Figure 3:
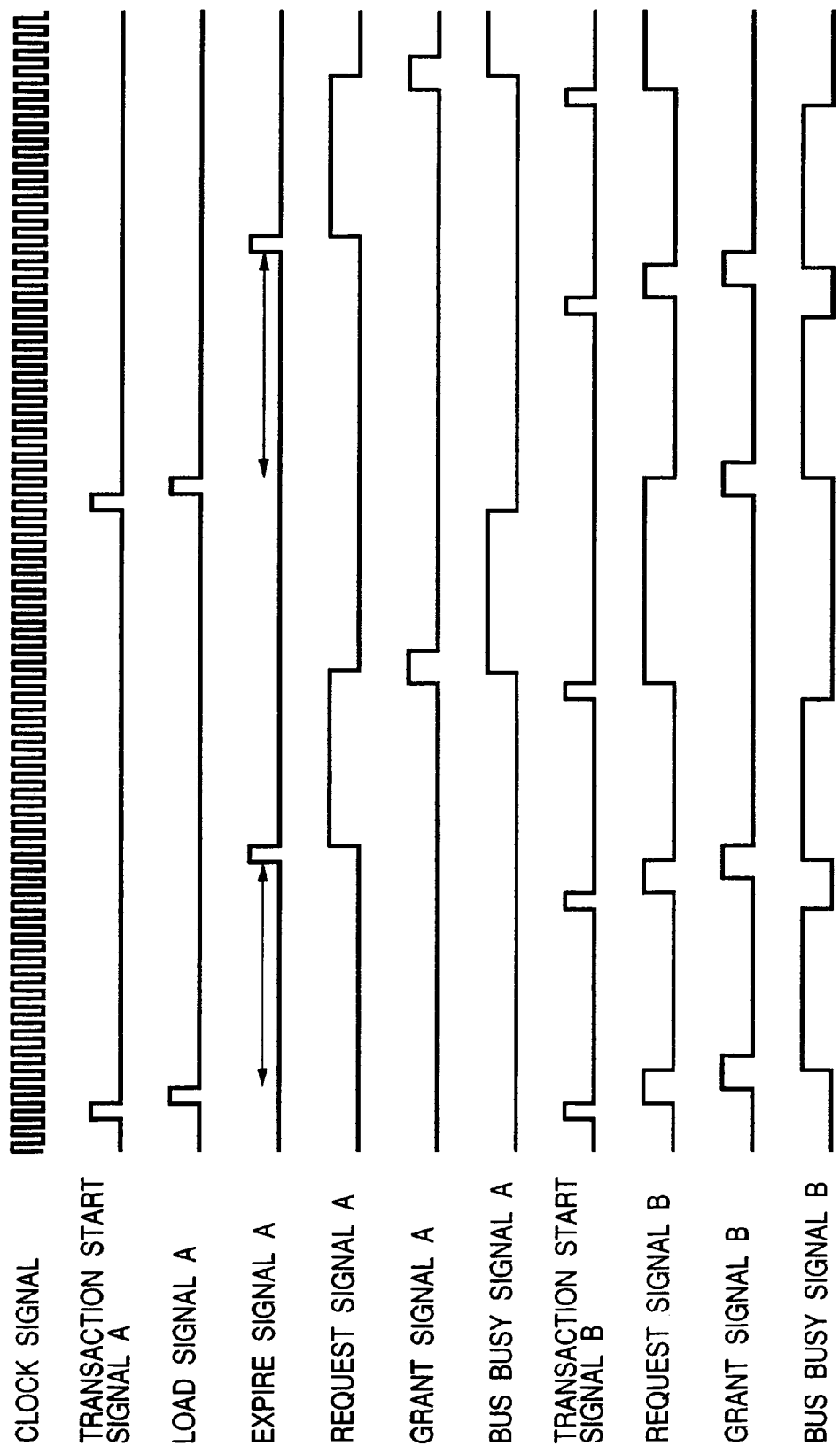
FIG. 3 is a chart showing an example of signal wave forms of the first embodiment.

FIG. 3 shows an example of signal wave forms in case two master apparatus, namely the master apparatus A101 and the master apparatus B102, request the use of bus in succession.

It is assumed that the master apparatus A101 is provided with an interval inserting function, with a set value of 15 cycles.

Each master apparatus indicates a request for starting a transaction, by a transaction start signal from the internal logic. The master apparatus B102 immediately asserts the request signal B to the arbiter 104. On the other hand, the master apparatus A101 asserts the request signal A after a lapse of 15 cycles. In the beginning, since the request signal is only asserted from the master apparatus B102, the arbiter 104 asserts a grant signal B thereby giving the bus use right to the master apparatus B102. In response, the master apparatus B102 initiates the transaction. It is assumed that the transaction requires 10 cycles. During the transaction, a bus busy signal B is asserted. Upon completion of the transaction, the internal logic of the master apparatus B102 again requests the start of a transaction, and requests the bus use right again by a request signal B. As the request signal A from the master apparatus A101 is not yet asserted even at this point, the master apparatus B is enabled again to use the bus.

Thereafter, the request signal A from the master apparatus A101 is finally asserted. When the master apparatus B completes the second transaction, the arbiter 104 then asserts the grant signal A, thereby giving the bus use right to the master apparatus A101. Now the master apparatus A101 initiates the transaction.

After the transaction is terminated, the internal logic of the master apparatus A again request the start of a transaction, but asserts the request signal A again after a lapse of 15 cycles. Therefore, the master apparatus B102 is again enabled to executes two transactions in succession.

As explained in the foregoing, by setting an interval of 15 cycles in the master apparatus A, the frequency of the use of bus becomes once for the master apparatus A101 whereas twice for the master apparatus B102. Thus, the priority for the bus use right can be adjusted by such interval setting. For example, the priority for the bus use right for the master apparatus B102 can be made even higher by increasing the set value of the interval for the master apparatus A101.

With an increase in the number of the master apparatus, the priority for the bus use right can be set more finely by setting an interval for each master apparatus.

Second Embodiment

Figure 4:
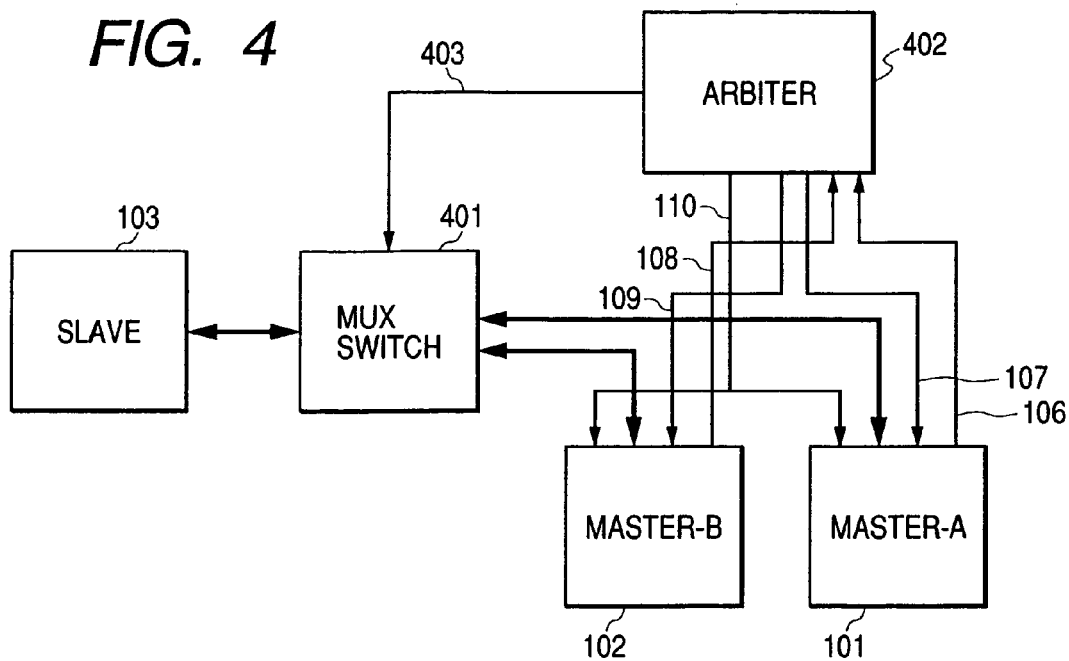
FIG. 4 is a block diagram of a system of a second embodiment.

The present invention is applicable not only to the master apparatus connected to the bus as shown in FIG. 1, but also to master apparatus connected to a multiplex switch as shown in FIG. 4. Referring to FIG. 4, a multiplex switch 401 connects a master apparatus A101 and a master apparatus B102 to a slave apparatus 103. An arbiter 402 receives requests from the master apparatus A101 and the master apparatus B102, executes arbitration, sends a grant signal to each master apparatus, and controls switching operation of the multiplex switch 401. A control signal 403 from the arbiter 402 controls the switching of the multiplex switch 401. The function of the master apparatus is same as a case of connection by a bus.

Third Embodiment

Figure 5:
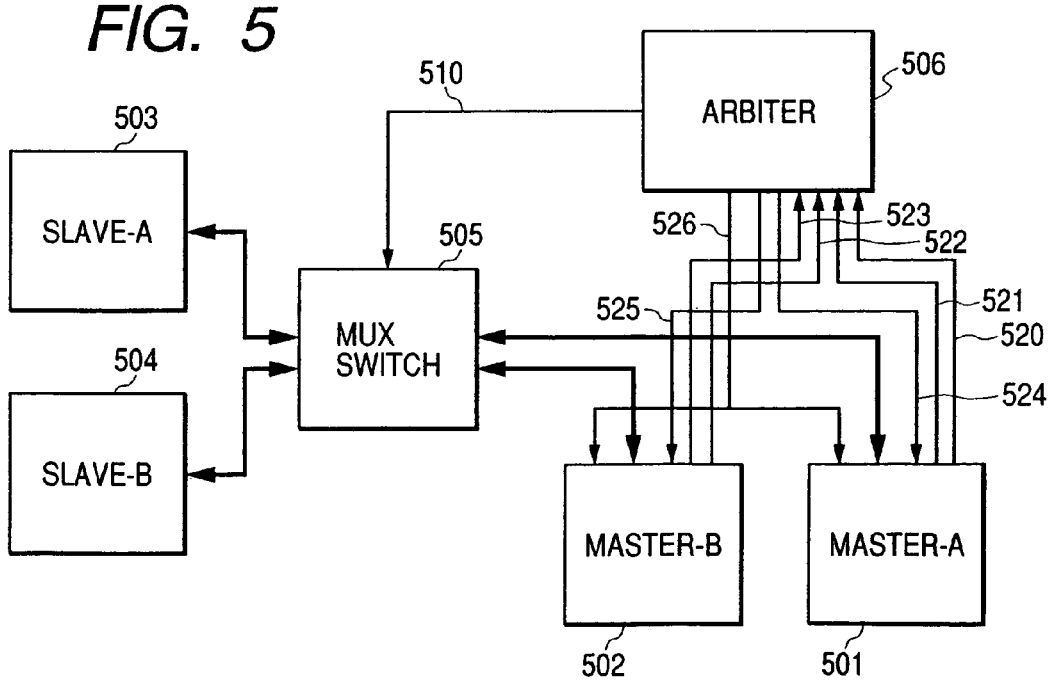
FIG. 5 is a block diagram of a system of a third embodiment.

FIG. 5 is a block diagram of a system of a third embodiment. A master apparatus A501, a master apparatus B502, a slave apparatus A503, and a slave apparatus B504 are connected to a multiplex switch 505. The multiplex switch 505 connects the master apparatus A501 to the slave apparatus A503 or the slave apparatus B504, and connects the master apparatus B502 to the slave apparatus A503 or the slave apparatus B504.

The master apparatus A501 asserts a slave A request signal A520 in case of requesting a connection to the slave apparatus A503, and asserts a slave B request signal B521 in case of requesting a connection to the slave apparatus B504. The master apparatus B502 asserts a slave A request signal B522 in case of requesting a connection to the slave apparatus A503, and asserts a slave B request signal B523 in case of requesting a connection to the slave apparatus B504.

An arbiter 506, receiving the request signals from the master apparatus A501 and the master apparatus B502, controls the multiplex switch 505 to a connection with the slave apparatus A503 or the slave apparatus B504. The arbiter 506 asserts a grant signal A524 in case of giving a slave connecting right to the master apparatus A501, and asserts a grant signal B525 in case of giving a slave connecting right to the master apparatus B502. The arbiter 506 controls the multiplex switch 505 by a switch control signal 510. A slave A idle signal 526 indicates that neither the master apparatus A501 nor the master apparatus A502 is connected to the slave apparatus A503.

In the present embodiment, the master apparatus A501 and the master apparatus B502 assert a request signal with the insertion of an interval in case of requesting a transaction to the slave apparatus A503, but assert a request signal without inserting the interval in case of requesting a transaction to the slave apparatus B504. Each master apparatus determines, based on addresses, whether the transaction is to be executed with the slave apparatus A503 or the slave apparatus B504.

Figure 6:
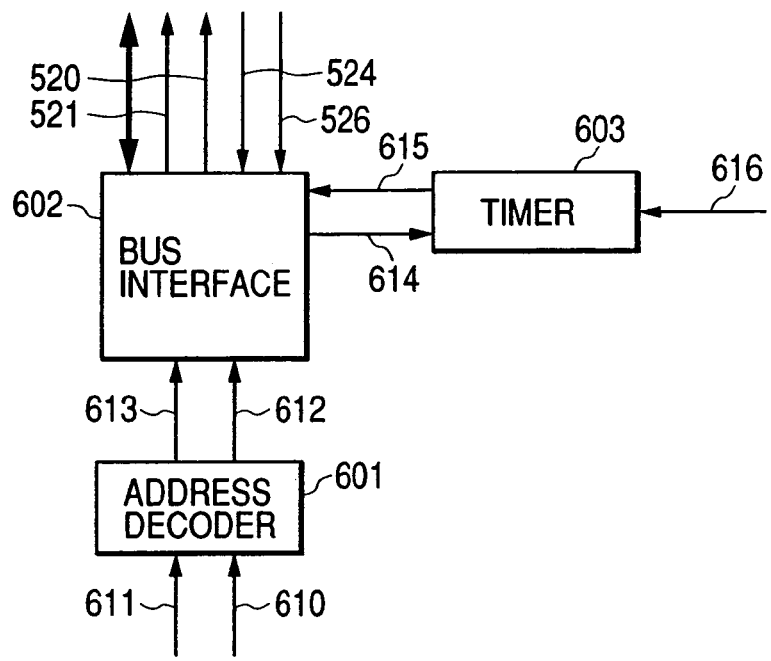
FIG. 6 is a diagram showing the details of a bus interface in a master apparatus of the third embodiment.

FIG. 6 is a block diagram around a bus interface of the master apparatus A501. An address decoder A601 and an interval timer A603 are connected to a bus interface A602. A transaction start signal A610 and a target address A611 of the transaction are entered into the address decoder A601. The transaction start signal A610 transmits a command to start the transaction utilizing the bus, from an internal logic of the master apparatus A501. The interval timer A603 counts an interval from a time when the transaction start signal A610 is asserted to a time when the request signal A520 is actually asserted. In the interval timer A603, an interval set value A616 is loaded according to a load signal A614. Such value can be changed for example by a register setting. An expiration signal A615 informs that the interval timer A603 has expired as a result of a count-down operation.

A slave A transaction start signal A612 is asserted in case the transaction request from the internal logic is for the slave A503, while a slave B transaction signal A613 is asserted in case the transaction request from the internal logic is for the slave B504.

Now, let it be assumed that the transaction start signal A610 is asserted by the internal logic of the master apparatus A501. In case the target address A611 is an address of the slave apparatus A503, the address decoder A601 decodes the target address A611 and asserts the slave A transaction start signal A612. The bus interface A602 transmits a load signal A614 to the interval timer A603 in order to insert an interval. The interval timer A603 loads the interval set value A616 and initiates a count-down operation. When the interval timer A603 reaches 0, an expiration signal A615 is asserted. In response, the bus interface A602 asserts the slave A request signal A520 to the arbiter 506.

On the other hand, in case the target address A611 is an address of the slave B and the slave B transaction start signal A613 is asserted, the bus interface A602 immediately asserts the slave B request signal A521 without inserting the interval.

In case a slave A idle signal 526, indicating the absence of the master apparatus connected to the slave apparatus A503, is asserted by the arbiter 506, even if the slave A transaction start signal A612 is asserted, the bus interface A602 immediately asserts the slave A request signal A520.

Fourth Embodiment

Figure 7:
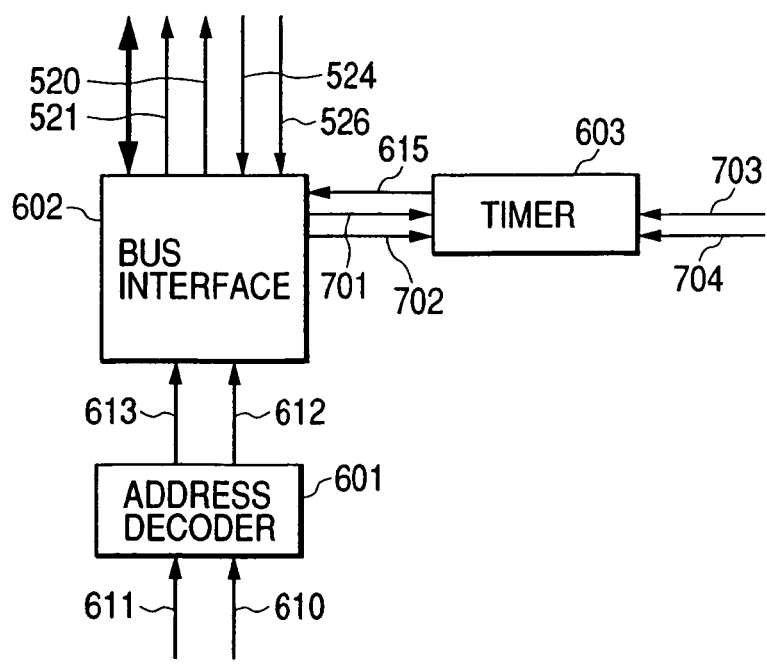
FIG. 7 is a diagram showing the details of a bus interface in a master apparatus of a fourth embodiment.

In a further application of the present invention, an interval different for each slave can be inserted by providing the master apparatus with a mechanism capable of varying the set value of the interval timer for each target slave. FIG. 7 is a block diagram around a bus interface in such application.

In case of a transaction to a slave apparatus A503, a slave A load signal A701 is asserted, while, in case of a transaction to a slave apparatus B504, a slave B load signal A702 is asserted. In case the slave A load signal A701 is asserted, a slave A interval set value A703 is loaded in an interval timer 603, but, in case the slave B load signal A702 is asserted, a slave B interval set value A704 is loaded in the interval timer 603. Such configuration enables to load an interval set value different for each target.

As explained in the foregoing embodiments, it is rendered possible to achieve detailed adjustment of the priority of the bus use right despite of the use of a simple arbiter, by inserting an interval of a predetermined length when a master apparatus connected to a bus or a multiplex switch requests a start of a transaction. Also the priority can be changed dynamically, by adjusting the length of the interval. It is also possible to prevent a decrease in the latency in a low traffic situation, by not inserting the interval when the bus is not in use.

Also in case the slave apparatus is present in plural units, the interval may be inserted only to a transaction to a specified slave. In this manner the priority can be made different for each slave.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A system including plural master apparatuses connected to a slave apparatus through a common path and an arbiter for arbitrating requests for using said path, each of the plural master apparatuses comprising:
   timer means which measures a respective predetermined interval for each master apparatus from a time when a use of said path becomes necessary in the master apparatus, wherein a length of the respective predetermined interval is set in correspondence with a priority of the master apparatus; and
   issuing means which issues a request signal requesting the use of said path after a lapse of the respective predetermined interval,
   wherein said arbiter arbitrates requests from the plural master apparatuses for using said path in an order of receiving the request signals.

2. A system according to claim 1, wherein said path is a bus.

3. A system according to claim 1, wherein said path is a multiplex switch.

4. A system according to claim 1, wherein each of the plural master apparatuses further comprises control means which inhibits the measurement by said timer means during a reception of a signal, indicating that said request signal is not yet received, from said arbiter, and causes said issuing means to immediately issue said request signal when the use of said path becomes necessary.

5. A system according to claim 1, wherein each of the plural master apparatuses is capable of access to plural slaves, and further comprises switch means which switches whether said issuing means issues said request signal after the lapse of said interval or immediately according to a slave constituting a target of the access.

6. A system according to claim 1, wherein each of the plural master apparatuses is capable of access to plural slaves, and wherein said timer means changes a length of said interval according to a slave constituting a target of the access.

7. An arbitration method in a system including plural master apparatuses connected to a slave apparatus through a common path and an arbiter for arbitrating requests for using said path, the method comprising steps of:
   measuring a respective predetermined interval for each master apparatus from a time when a use of said path becomes necessary in the master apparatus, wherein a length of the respective predetermined interval is set in correspondence with a priority of the master apparatus, and issuing a request signal requesting the use of said path from the master apparatus to said arbiter after a lapse of the respective predetermined interval; and
   arbitrating the requests from the plural master apparatuses for the use of said path by said arbiter, in an order of receiving the request signals.

8. An arbitration method according to claim 7, wherein at least one of said plural master apparatuses issues the request signal requesting the use of said path immediately when the use of said path becomes necessary.

* * * * *